March 26, 1940.　　T. ZOBEL ET AL　　2,195,384
METAL CUTTING PROCESS
Original Filed April 8, 1937
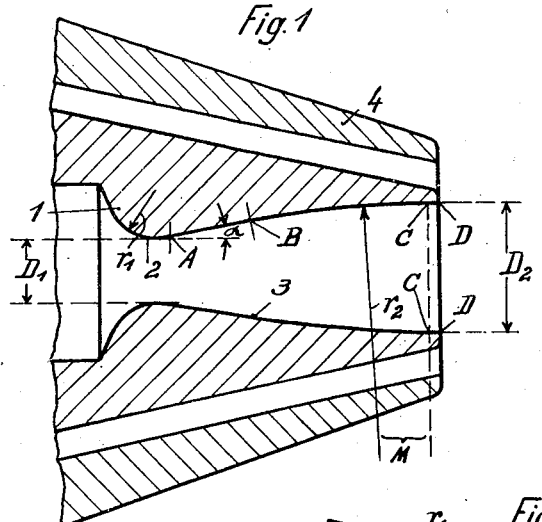
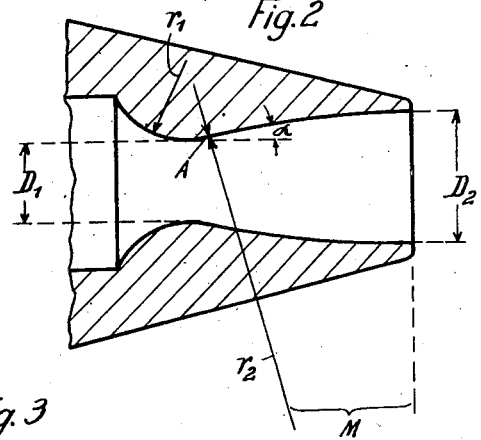
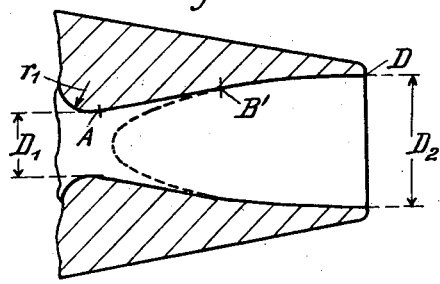
INVENTORS
THEODOR ZOBEL
ULRICH NOETZLIN
BY Chas. C. Scheffler
ATTORNEY Patented Mar. 26, 1940

2,195,384

UNITED STATES PATENT OFFICE 2,195,384

METAL CUTTING PROCESS

Theodor Zobel and Ulrich Noetzlin, Berlin, Germany, assignors, by mesne assignments, to The Linde Air Products Company, New York, N. Y., a corporation of Ohio Original application April 8, 1937, Serial No. 135,766. Divided and this application November 10, 1939, Serial No. 303,777. In Germany July 2, 1935

5 Claims. (Cl. 148—9)

This invention relates to a metal cutting process utilizing a nozzle of novel shape to discharge oxygen against metal heated to a high temperature.

Nozzles or tips heretofore used for oxygen or "autogenous" cutting of metal have been formed with either straight cylindrical or stepped cylindrical bores, the latter shape representing the improved form and being almost exclusively in use at present for this reason. However, even a nozzle of this kind is imperfect from a physical and aerodynamic standpoint as it still leaves very much to be desired with respect to the development and utilization of the dynamic energy and the form of the oxygen jet produced.

The oxygen jets from such nozzles or tips at pressures greater than the critical pressure are subject to impulse losses which rapidly increase with increasing pressure, thus considerably decreasing the cutting efficiency. Attempts have been made in practice to overcome this deficiency by designing each cutting tip for only a very small pressure range and thus also for a very small cutting range, maintaining the oxygen at the optimum working pressure for each size of tip. In this case it is necessary to use a number of tips of different sizes for covering a wide cutting range. However, with increasing thickness of material the conditions get more and more unfavorable inasmuch as, besides the lack of economy in the use of large tips, it is necessary to increase the pressure which of necessity implies a deterioration of the flow conditions in the cutting jet.

Therefore, it would be advantageous to make use in cutting tips of the "Laval" effect which is known from other fields of technique. As is well known, the Laval nozzle under certain conditions renders it possible to convert gas pressure into gas velocity, in a divergently tapered portion following the smallest cross-section of the nozzle.

It has been suggested already in the literature to use the Laval nozzle in its known simple form for cutting torches. However, due to the fact that the Laval nozzle is extremely sensitive to even slight inaccuracy in the pressure adjustment and that different nozzles are required for different working pressures, the Laval nozzle hitherto has been a failure in its application to cutting torches. The ideal cutting torch should permit a transformation of gas pressure into gas velocity substantially without losses, and should possess this property for a very wide or even any range of working pressures, delivering an approximately parallel, compact gas jet having a maximum velocity with minimum cross-sectional area of the jet.

The nozzle used in practicing our novel cutting process, due to the particular design and shape of the oxygen passage, meets with these ideal requirements and, therefore, differs fundamentally in its aerodynamic effect and operation from the ordinary Laval nozzle.

In our cutting tip the transitional portions at the inlet of the nozzle and at its smallest cross-section are gently curved or well rounded, and the surfaces of these portions are convex relative to the longitudinal axis of the nozzle. In contradistinction to the ordinary Laval nozzle, a conical portion of our nozzle is followed by a transitional arched portion, the surface of which is concave relative to the longitudinal axis of the nozzle, and which is so shaped as to terminate in a cylindrical end portion. It is also possible to design the nozzle in such a manner that the two arched or curved portions at the inlet and the exit of the nozzle pass over directly into one another in a turning point of the profile curve, i. e. in a point representing a common tangent to both of the arches.

A very favorable form of our novel nozzle is obtained if the portions following the smallest cross-section merge into a curved portion, concave relative to the longitudinal axis of the nozzle, and which terminates in a cylindrical portion at the exit of the nozzle and corresponds approximately to a portion of a flat ellipse ending at the short axis of the ellipse, while the tangents contacting the said portion following the smallest cross-section do not exceed an angle of 10° with respect to the center axis of the nozzle and if the expansion ratio resulting by dividing the largest diameter by the smallest diameter of the nozzle does not exceed 2.

An important element of this nozzle as distinct from the ordinary Laval nozzle is the curved section following the conical nozzle portion which diverges at a relatively greater angle. By this curved section it is possible to induce the stationary Mach's waves produced in the case of a velocity beyond the velocity of sound—which waves penetrate each other and are reflected according to definite laws at the boundaries of the jet—to adopt a flowing direction such that the jet having a velocity above that of sound, when leaving the nozzle, takes the form of a parallel or cylindrical jet, or at least a very close approximation thereto without being subjected to a compression shock or impulse. The same phenomenon will result in case of any other pressure conditions within the nozzle, the jet always separating or peeling off from the flanks of the nozzle at the point where its expansion is completed, and merely the angle between the first reflection wave and the jet axis is changed, which latter factor has no bearing, however, on the further shape of the jet. With a nozzle of this type it is possible to obtain a compact cutting oxygen jet of a cylindrical or nearly cylindrical shape within a wide range of working pressures. This phenomenon, although not in accordance with the former aerodynamic theory, has been established by our systematical experimental work.

With nozzles of this kind, it is possible to produce, in the effective cutting portion of an oxygen jet always having a velocity above the acoustic, perfect shape even in the case of the difficult working conditions existing with cutting torches. The nozzle used in practicing the invention delivers a narrow compact oxygen jet that always retains its narrow form in the effective cutting portion thereof and for considerable distances from the nozzle orifice. A relatively wider range of oxygen inlet pressures may be employed and a relatively wider range of plate thicknesses may be cut with a given size nozzle than with prior commercially employed nozzles.

The invention will be better understood by reference to the drawing showing diagrammatically, by way of example and on an enlarged scale, some embodiments of the invention, viz:

Fig. 1 is a longitudinal section of a cutting tip with which the process of the invention may be practiced, and having a straight conically extending outlet terminating in an arc of a circle;

Fig. 2 is a longitudinal section of a similar tip, the straight conical portion between the arcs being reduced, however, to a transition point; and Fig. 3 is a longitudinal section of a tip similar to that of Fig. 1, the conical portion terminating, however, in an arc of an ellipse.

Referring now to the drawing, and first to Fig. 1, $D_1$ is the diameter of the narrow constriction or throat 2 between the gently curved inlet portion 1, of the nozzle, and the divergently tapered outlet 3; and $D_2$ is the maximum diameter at the orifice of the nozzle. It will be seen that the inlet portion 1 of the nozzle is shaped to the arc of a circle having a radius $r_1$, and terminates, in the direction of flow, in a straight conical profile portion, which extends from point A to point B and this portion terminates, in turn, in a circular arc around the center point M and having a radius $r_2$ (which is shown at a reduced length). The center point M may be arranged in the plane of the end face D—D of the orifice or inwardly spaced therefrom to form a very short cylindrical portion C—D at the end of the arc B—C while portion C—D, of course, forms a tangent to the arc B—C at point C. The angle formed between the conically enlarged portion A—B and the center axis of the nozzle is indicated at $\alpha$. The nozzle thus includes a throat having a curved surface constituting a surface of revolution coaxial with but convex relatively to the nozzle axis and an intermediate section comprising a curved surface constituting another surface of revolution coaxial with but concave relatively to the nozzle axis. the intermediate section also comprising a transition portion connecting the convex and concave surfaces of revolution. For the sake of completeness the outer annular duct for the preheat gases has been indicated at 4 in this figure, but has been omitted from Figs. 2 and 3 as it has nothing to do with our invention.

Referring now to Fig. 2, the profile of the nozzle bore is similar to that of Fig. 1, with the exception that portion A—B is reduced to a single point A representing the turning point between the circular arc $r_1$ and the circular arc $r_2$ around center point M (which is shown at a still further reduced length).

Referring to Fig. 3, the arc of a circle B—C of Fig. 1 has been replaced by an arc of an ellipse B'—D, the rest of the left half of the ellipse being indicated in dotted lines in order to show what portion of the ellipse has been incorporated in the nozzle profile.

Referring to any of Figs. 1–3, it will be seen that the ratio between the maximum diameter $D_2$ at the delivery orifice and the minimum diameter $D_1$ at the narrow constriction or throat does not exceed the value $D_2/D_1=2$. A larger ratio of diameters would materially deteriorate the properties of the bell-shaped nozzle and render it unsuitable for the purpose of oxygen cutting if the diameter ratio exceeds the value $D_2/D_1=3$.

With regard to the angle $\alpha$ between the divergent conical portion and the nozzle axis, angles up to $\alpha=10°$ may be used, but the efficiency of the nozzle decreases with further increasing values of angle $\alpha$ and the tip becomes entirely unsuitable when the angle exceeds about $\alpha=20°$. The flanks have a curved form over at least a substantial portion of their longitudinal extension. Generally, the curved portion should not be shorter than about ⅓ of the total length of the nozzle. Preferably, the nozzle used in practicing the invention is constructed with an oxygen passage provided with a throat, the wall between said throat and the discharge mouth of the passage having an initially wide divergence or included angle of 14° or more followed by a curving section that approaches a cylinder at the mouth. The termination of the curved section at the nozzle mouth is necessary, in conjunction with the short wide-angle expanding section, to secure the optimum desired results set forth herein. In the example shown in Fig. 1, the length of the curved portion B to C is about half of the total length, which is an optimum value in many instances.

It will be noted that the angle of divergence of the forms of nozzles illustrated is considerably greater than that ordinarily used in divergent nozzles of the so-called "Laval" type, while the ratio of throat diameter to final exit diameter is substantially the same. The relatively large angle of divergence is compensated by the short curved section adjacent the mouth of the nozzle so that despite the rapidity of the initial expansion, as compared to that of a nozzle of the Laval type, a substantially parallel-sided issuing jet having the desired high velocity is obtained. A smaller number of nozzles constructed according to the principles of our invention will be needed to cut the complete range of thicknesses of metal commercially encountered because each nozzle will efficiently cut a relatively wide range of thicknesses as compared to customary nozzles. The reason for this, as previously explained, is due to the action of the curved exit portion in cooperation with the initial relatively rapidly expanding portion of the passage. The oxygen stream produced is thus not sensitive to a variation of pressure above or below that theoretically required. When the pressure is lower than the theoretical optimum the stream tends to leave contact with the diverging portion of the walls without material deterioration of its shape. The cylindrical portion at the mouth of the nozzle prevents a loss or variation from parallel flow and may cause the stream to regain contact with the passage walls before issuing into the atmosphere. When the theoretical pressure is exceeded the stream remains approximately parallel within a relatively large range.

Practical experiments have shown that the linear cutting speeds attainable with our novel cutting process are 50 to 100% higher than the maximum linear cutting speeds attainable with cutting torches used at present, while the oxygen consumption is not higher and the cut faces are very clean and smooth. Another advantage of our novel cutting process resides in its high adaptation to different cutting conditions. For instance, practical experiments have shown it possible to cut objects of any thickness up to 200 mm. with a single tip having a mouth of 1.5 mm. minimum diameter with very good efficiency, whereas different nozzles or tips having a wide range of mouth diameters would have been required for different thickness of the material if using ordinary tips.

The improved process of cutting a ferrous metal body will be apparent from the foregoing description. Briefly, the oxygen supplied to the cutting oxygen passage of the nozzle is expanded as it flows through said passage by an amount sufficient to effect an increase in the velocity of the oxygen stream to a value exceeding the acoustic velocity at the exit of the passage. This expansion, as explained, is effected at a rate which initially has a high value and subsequently gradually decreases to a value that is approximately zero at the exit of said passage. The effective cutting portion of the discharging stream, which is compact and of substantially uniform cross-sectional area, is directed against successive portions of the metal body which have been preheated to an ignition or kindling temperature, e. g., by preheating flames successively applied along the cutting line and supported by a combustible mixture discharging from an adjoining passage or passages, as indicated at 4 in Fig. 1.

If the tip is made of copper or a similar soft material it is preferable to produce it by "chipless shaping" so as to attain the highest precision of the polished surface and shape of the profile of the nozzle bore. This may be effected, for example, by forcing one or several calibrated mandrels into a piece of material having a cylindrical bore corresponding approximately to the smallest cross-section of the nozzle profile. It is also possible to produce the profile by starting from a cylindrical bore corresponding approximately to the maximum diameter of the nozzle profile and reducing the nozzle diameter by rolling or drawing the nozzle piece over one or more calibrated mandrels representing the inner shape of the nozzle.

This application is a division of our application Serial No. 135,766, filed April 8, 1937, now Patent No. 2,175,160, issued October 3, 1939.

What is claimed is:

1. A process of cutting metal with a jet of oxygen having a substantially parallel-sided form and a velocity above that of sound which comprises supplying oxygen under pressure to flow as a stream, expanding said stream by an amount sufficient to effect an increase in velocity thereof to a value exceeding that of sound, said expansion being effected at a rate having an initially relatively high value subsequently decreasing gradually to a value approaching zero, and directing the resultant jet against heated metal to cut a kerf of relatively narrow width.

2. A process of cutting metal with a jet of oxygen having a substantially parallel-sided form and a velocity above that of sound which comprises supplying oxygen under pressure to flow as a stream, expanding said stream by an amount sufficient to effect an increase in velocity thereof to a value exceeding that of sound, said expansion being effected in two stages, the first stage of expansion being at a constant relatively high rate and the second stage of expansion being at a rate gradually decreasing from said high rate to a value approaching zero, and applying the resultant jet against heated metal to cut kerfs of relatively narrow width.

3. A process of cutting metal with a jet of oxygen having a substantially parallel-sided form and a velocity above that of sound which comprises supplying oxygen under pressure to flow as a stream, expanding said stream by an amount sufficient to effect an increase in velocity thereof to a value exceeding that of sound and to cause said stream to assume a parallel-sided form for a considerable distance, said expansion being effected at a rate which constantly decreases from an initially high value to a value approaching zero; and directing the resultant jet against heated metal to cut a kerf of relatively narrow width.

4. A process of cutting a ferrous metal body which comprises supplying gaseous oxygen under pressure to a passage extending through a nozzle; expanding such oxygen, within said passage and while flowing therethrough as a stream, by an amount sufficient to effect an increase in the velocity of said stream to a value exceeding the acoustic velocity, such expansion being effected at a rate initially having a relatively high value which subsequently decreases gradually to a value approximately zero at the exit of said passage whereby, irrespective of substantial changes in the pressure of the supplied oxygen, the cutting oxygen stream discharging from said exit always has a velocity above the acoustic and its effective cutting portion always is a compact stream of substantially uniform cross-sectional area; preheating successive portions of said body to an ignition temperature; and directing the effective cutting portion of such discharging cutting stream successively against such preheated portions to cut said body.

5. In the art of oxygen cutting of metals, the process of delivering an oxygen cutting jet having a substantially parallel sided form and a velocity above that of sound which comprises supplying oxygen under pressure to flow as a stream and expanding said stream by an amount sufficient to effect an increase in velocity thereof to a value exceeding that of sound, said expansion being effected at a rate having an initially relatively high value subsequently decreasing gradually to a value approaching zero.

ULRICH NOETZLIN.
THEODOR ZOBEL.